T. FAIRBANKS.
Weighing-Scale.
No. 163,060. Patented May 11, 1875.
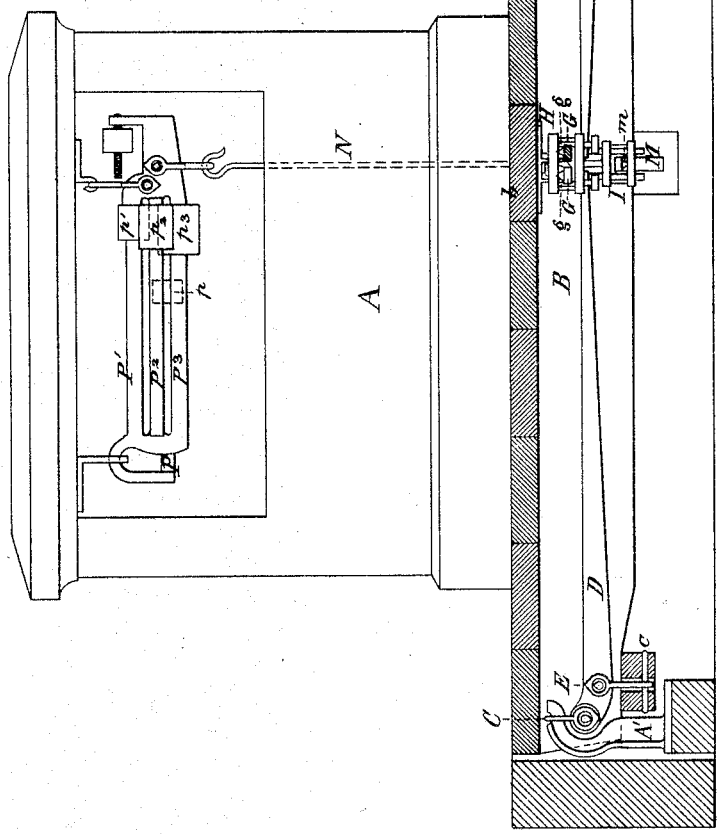

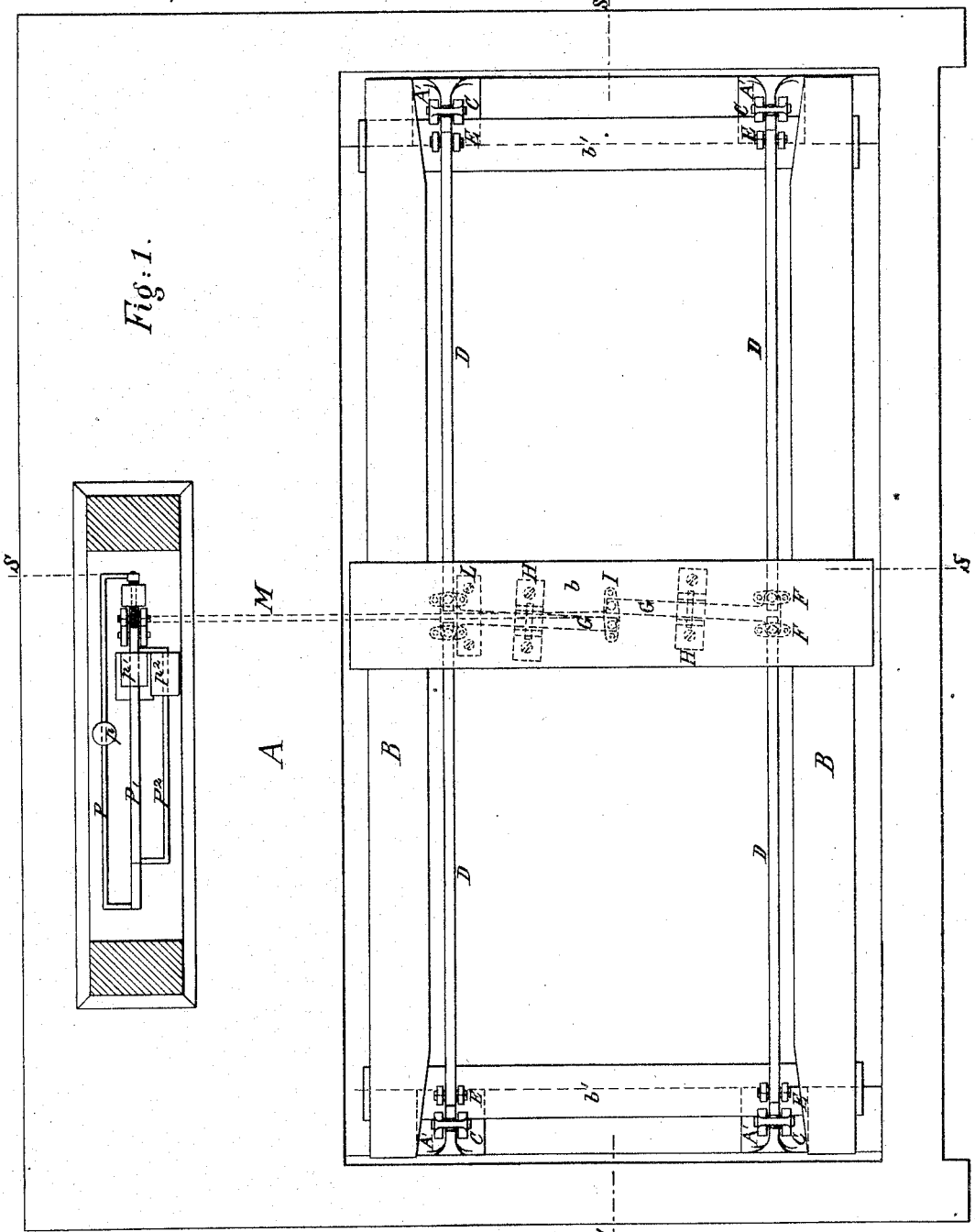

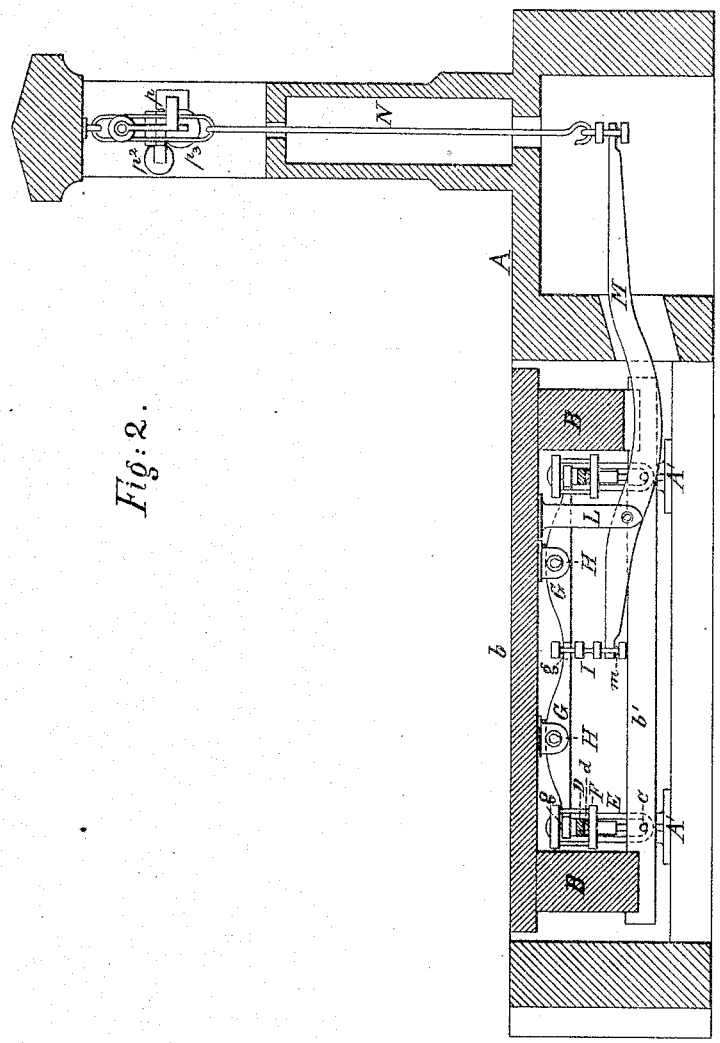

UNITED STATES PATENT OFFICE.

THADDEUS FAIRBANKS, OF ST. JOHNSBURY, VERMONT.

IMPROVEMENT IN WEIGHING-SCALES.

Specification forming part of Letters Patent No. 163,060, dated May 11, 1875; application filed December 15, 1874.

*To all whom it may concern:*

Be it known that I, THADDEUS FAIRBANKS, of St. Johnsbury, Caledonia county, Vermont, have invented certain Improvements relating to Weighing-Scales, of which the following is a specification:

The invention applies to all forms of scales for weighing hay, coal, and the like.

It is, in practice, highly desirable to manufacture scales complete at the shop, and to ship them to distant points in a condition which will require as little skill and labor as possible in setting them up. It is also desirable to guard against any evil results from slight imperfections in the setting up, and subsequent disturbances in the position of any of the parts in consequence of irregular settling, or the decay of any part, or the like.

It is customary to provide scales with what are called "check-rods." These check-rods are almost necessarily a little loose. It is desirable to allow to the platform of the scale perfect liberty to swing or move horizontally in all directions to such extent as is allowed by the check-rods.

The present invention provides means for attaining all these ends, and, withal, brings the levers so nearly in the same horizontal plane that but little vertical depth is required, which is a consideration of importance in some situations, as, for example, in the floors of barns and warehouses. I propose to send from the shops two timbers or bars properly prepared, to extend across between the lower sides of the main longitudinal timbers or platform-sticks, and to be suspended by loops from the main levers. I propose also to send from the shop one plank of sound wood, to extend across above in the center of the length, and which shall serve as one of the planks of the platform. To this I attach the cross-levers, and also what is sometimes known as the "last lever"— the lever which receives the strain—and extending out beyond the bounds of the platform is a medium of communication to the vertical rod, which extends up to the weighing-beam; in other words, all the middle work of the scale is permanently and accurately mounted by skilled workmen in the shop on a single cross-piece. The ordinary carpenter who sets up the scale has simply to construct the rough, heavy wood-work, and attach thereto the parts already prepared at the shop.

Conical points have been long known in connection with scales as well adapted to receive and transmit light strains. I employ broad and strong knife-edges to receive the strains in the first instance, and, after reducing the strains by a great difference in length of the arms of my first levers, succeed in transmitting all the subsequent strains through conical points by means of peculiar yokes, so constructed and arranged as to allow perfect freedom of motion in all directions. The arrangement allows the entire work to swing freely both longitudinally and laterally.

The following is a description of what I consider the best means of carrying out the invention.

The accompanying drawings form a part of this specification.

Figure 1 is a plan view. Fig. 2 is a cross-section, and Fig. 3 a longitudinal section, showing the entire scale adjusted for weighing a considerable load, but not the maximum. Fig. 4 is a cross-section of one of the main levers on the line T T in Fig. 3, when in its ordinary position. Fig. 5 represents the same when the platform is swung to one side much more than will ever be allowed. It illustrates how the construction provides for lateral as well as longitudinal swinging. The dotted lines below the lever in this figure show the position of the links or loops connecting the lever with the bottom cross-piece of the platform.

Similar letters of reference indicate corresponding parts in all the figures.

A is the fixed frame-work. B B are the longitudinal timbers of the platform, ordinarily termed platform-sticks, and $b$ is one of the cross-planks which form the top. Other planks or stout cross-bars $b'$ $b'$ receive the platform-sticks B at a lower plane, and perform the important function of receiving the entire load which is placed on the platform, and transmitting it to the levers. D D are the first levers. They extend longitudinally just within the platform-sticks B. Their stoutest ends are hung up by loops C to firm supporting hooks or standards A'. Loops E descend from the levers D near the same end, and, standing loosely in slots, take hold of pins $c$ set in the cross-pieces $b'$.

The whole is obviously free to vibrate longitudinally. When the scale tends to vibrate transversely it may do so, if the first levers D are allowed to correspondingly rock or vibrate laterally pendulum-wise, the top bearing of the loops C being rolling or rocking centers for such motion. The rocking motion thus involved is in practice very slight. I provide amply for much more than is ever required.

The loops C E, which carry heavy loads, are connected to knife-edges on the levers D. The small end of each of these levers D carries not a knife-edge, but a conical point, $d$. M is the last lever, extending out to the rod N, which leads up to the weighing-beam. It is fulcrumed on a double bracket, L, fixed on the under face of the cross-piece $b$. Its inner end comes under the center of the platform, and rests with a conical point, $m$, in the yoke I. The upper part of this yoke is widened, and receives side by side the inner ends of two cross-levers, G. These levers are hung up by short brackets H to the same cross-plank $b$. Each is suspended in the bracket H by a knife-edge, but is provided at each end with a cone-point, $g$. The cross-levers G are each mounted a little obliquely, so that their inner ends lie side by side in the yoke I without touching each other. As they turn slightly in transmitting the motion they induce a slight twisting of the yoke I, which motion the conical points allow for.

The outer end of each cross-lever G is branched or made of a T form. Each branch is provided with a conical point, $g$, which engages with a yoke, F, and receives the load transmitted from one of the longitudinal or first levers D.

It will be understood that the work is made with the exactness well known to be necessary in this class of instruments, and that care is taken to have the several knife-edges or conical points in a lever work in a very nearly horizontal plane when the scale is in use.

The weighing-beam performs all the ordinary functions of that important member of the mechanism, with the addition of a feature or modification, by which several poises, corresponding in function to the ordinary removable weights upon the counterpoise, are permanently attached, each on a corresponding bar, and capable of being moved instantly from one end to the other of their respective bars. The beam has the feature common to several before known of being formed with a number of parallel bars, marked, respectively, P $P^1$ $P^2$ $P^3$. The bar P is graduated, and carries a poise, $p$, which weighs in the ordinary manner. The other bars need not be graduated. They are preferably left entirely plain, or provided only with a mark or notch at each extremity, to aid in assuring that the corresponding weights are left in exactly the right positions. They perform their functions by one or more of the weights $p^1$ $p^2$ $p^3$ being shifted by the attendant from one end to the other of their respective bars. This movement of each weight corresponds to the taking off of an ordinary weight from a counterpoise depending from the extreme end of the ordinary beam, or putting on the same. The bar $P^2$ carries a heavier weight, $p^1$, correspondingly operated, and the bar $P^3$ carries a still heavier one. Each of the bars $P^1$ $P^2$ $P^3$ is plainly marked with the amount to which the shifting of its respective poise corresponds. The corresponding poises are also preferably so marked. The full capacity of the beam P being one thousand, or some convenient decimal number, that of $P^1$ should be the same, and that of $P^2$ equal to the added capacity of P and $P^1$, say two thousand, and that of $P^3$ equal to the added capacity of P, $P^1$, and $P^2$, say four thousand, and so on, continuing the series of beams or bars to any desirable number, the capacity of the last beam being equal to that of the added amount of all the others.

This provision overcomes a difficulty heretofore experienced in consequence of the occasional misreading of the number or grade of weight added to the beam. It is easier to observe the position of the weights on the bars $P^1$ $P^2$, whether they are at one end or the other, than it is to determine what weights are in the compact pile corresponding thereto upon the counterpoise depending from the end of the ordinary beam. The permanent connection, also, of these weights avoids the possibility of their being lost.

It being understood that the scale is properly set up and equipped with all ordinary appliances, including check-rods and a complete decking of the platform, the operation of weighing is conducted in the ordinary manner, except that in weighing widely-varying quantities, as hundreds, thousands, &c., instead of putting on or taking off the detachable weights from the rod depending from the end of the weighing-beam, I move one or more of the weights or poises $p^1$ $p^2$ $p^3$ from one end to the other of the bars $P^1$ $P^2$ $P^3$. Then, having thus got the scale into the same condition as if the corresponding weights had been hung on or taken off the end of the beam, I proceed to weigh the balance or fractional weight by moving the poise $p$ on the bar P, and observe the graduation at which the scale balances in the ordinary manner.

Any irregular settling of the scale is allowed for by the freedom of suspension of the loops C and E. The whole platform is at liberty to vibrate in all directions, except as it may be controlled by the check-rods. Obviously longitudinal play is allowed by the ordinary longitudinal swinging of the loops C. Cross swinging is allowed by the cross pendulous movement from the supports $A'$. The radius for this motion is the entire height from the top bearing of the loop C to the bottom bearing of the loop E. The lateral swinging of the levers D, and the corresponding changes of position induced thereby, is represented greatly exaggerated in Fig. 5. This motion involves no rolling of the knife-edges, but only of the loops. The same rolling is allowed for by the conical point $d$ at the small end of each lever. The changes of position of the cross-levers or intermediate levers, and of the principal levers D, induce a compound motion in the yokes F in both directions—that is to say, swinging lengthwise of the platform, and also swinging crosswise of the platform. These motions are slight with the small motion of the levers allowed in practice, but are too great to be left unprovided for. Knife-edges, as ordinarily arranged, would not allow of them, but the cone-bearings above and below allow these motions with perfect freedom. The turning of the transverse levers G induces a twisting motion of the yoke I, which, as also the slight change of position laterally due to the turning of the last lever M, is accommodated by the cone-points bearing therein.

It will be understood that the several yokes are formed with shallow conical recesses, each having a more flaring form than the corresponding cone-point, which it is to receive.

When the platform swings in any direction, either temporarily under the action of a draft-animal, or the motion of a loaded wagon, or the like, or permanently in consequence of any irregular settling or imperfection, the entire central work of the scale goes with it—that is to say, the cross-levers G and last lever M being all pivoted, not on fixed supports or on links or loops hung from fixed supports, but on bearings fixed on the platform itself, the levers go with the platform in all its motions. This fact must, of course, be considered in determining the multiplying power and proportions of the several levers.

The permanent attaching of the brackets H and L to the single plank $b$ facilitates the construction and the avoidance of imperfections. Some of the advantages of the invention can, however, be realized with the attaching the said brackets to other points. I use the word twisting in connection with the yokes I and F, to indicate a turning partly around on the vertical axis.

The peculiarity of the beam is made the subject of a separate application.

What I here claim as my improvement in weighing-scales is—

1. The brackets H and L, secured to the cross-plank $b$, so that both shall be carried by the platform B, and supporting the intermediate lever G and last lever M, as and for the purposes specified.

2. The cross timbers or bars $b'\ b'$ and loops E, in combination with the main platform-sticks B B and the main levers D D, as and for the purposes herein specified.

3. The obliquely-mounted transverse levers G, having their inner ends adjacent, but out of contact with each other, and provided with conical points $m$, in combination with the twisting yoke I, and the last lever M and its connections, as herein specified.

4. The yokes I F and conical bearing-points $d\ g\ m$, in combination with the longitudinally-arranged main levers D, transverse levers G, and suitable connections therefrom to the weighing-beam, as herein specified.

In testimony whereof I have hereunto set my hand this 3d day of December, 1874, in the presence of two subscribing witnesses.

THADDEUS FAIRBANKS.

Witnesses:
 ELIJAH D. BLODGETT,
 PERLEY F. HAZEN.